April 29, 1930. O. M. TUCKER ET AL 1,756,109
METHOD AND APPARATUS FOR SUPPORTING AND DELIVERING VISCOUS GLASS
Filed Sept. 14, 1925  8 Sheets-Sheet 1

OLIVER M. TUCKER
WILLIAM A. REEVES   INVENTORS.

BY Edwin P. Corbett
ATTORNEY.

OLIVER M. TUCKER
WILLIAM A. REEVES INVENTORS.

BY

ATTORNEY.

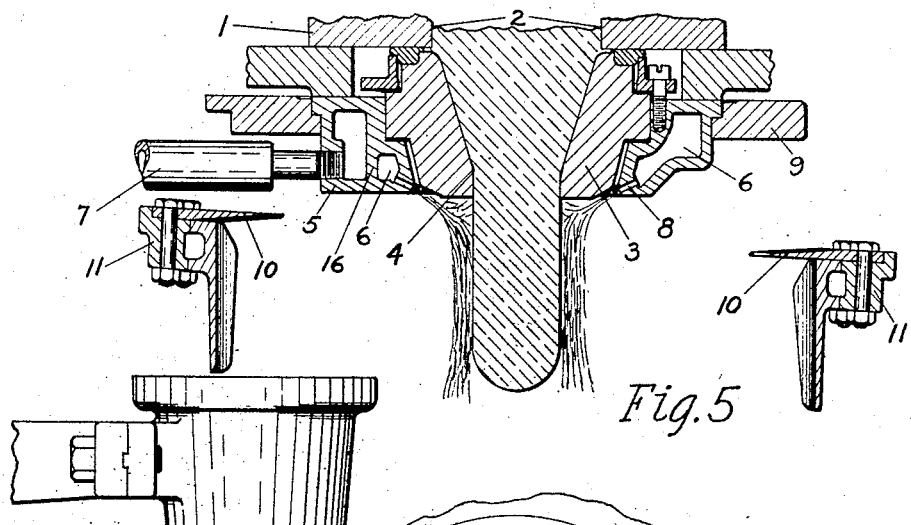
Fig.5
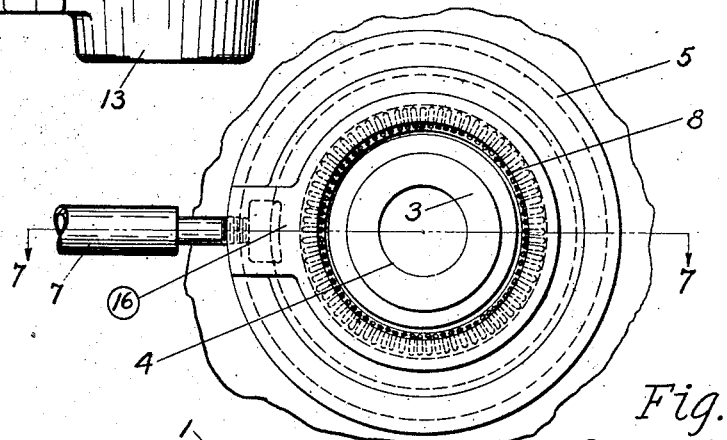
Fig.6
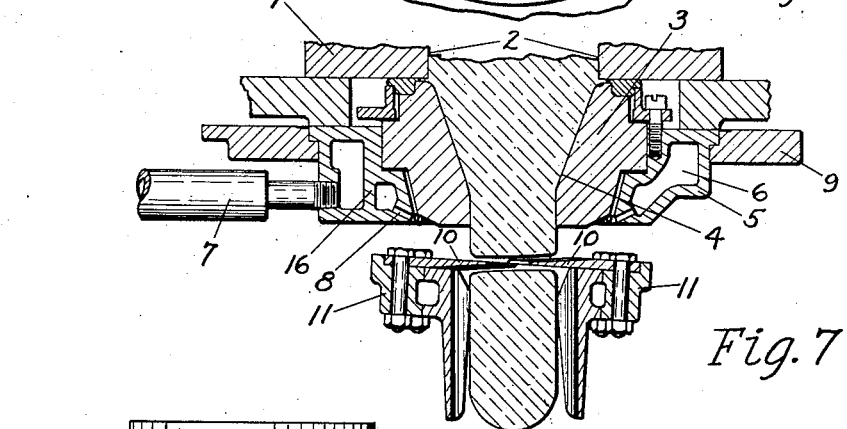
Fig.7
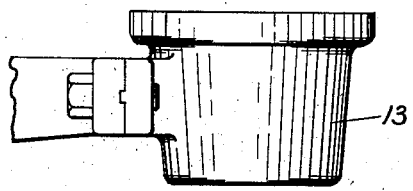

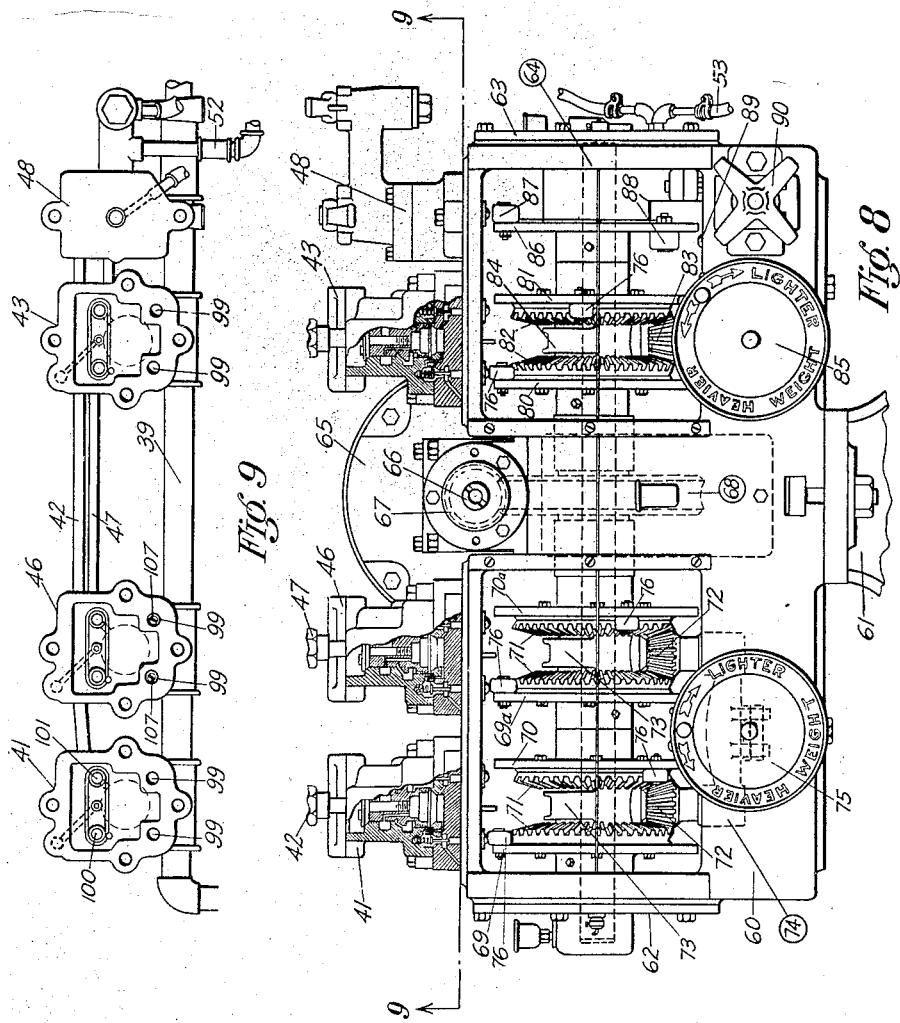

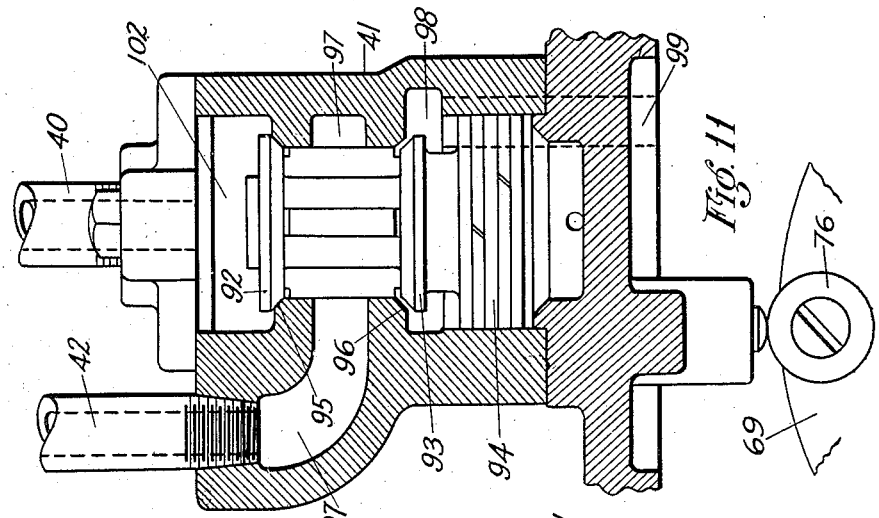
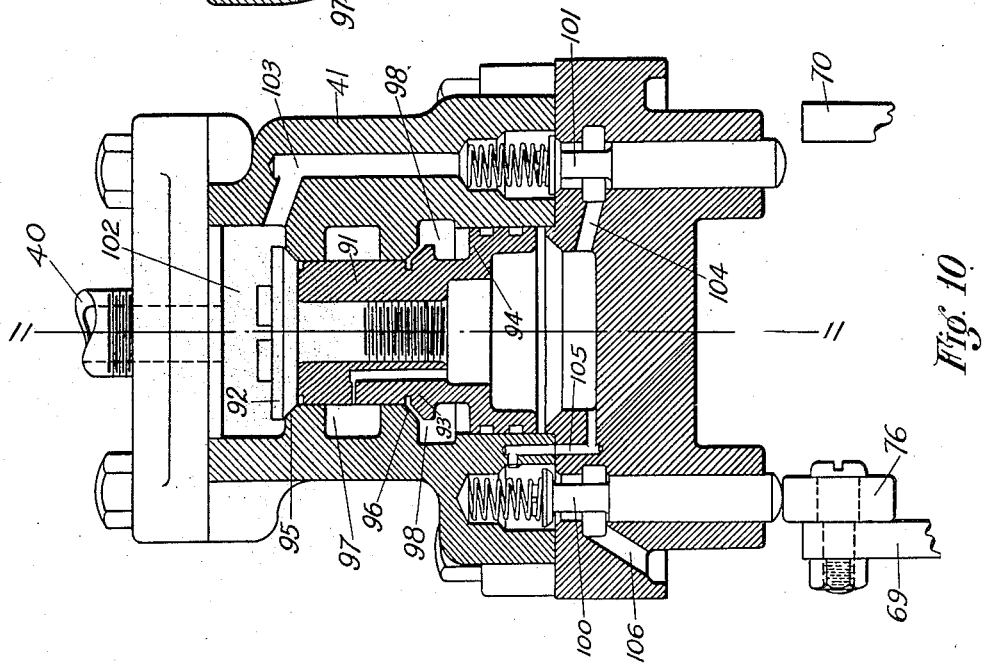

April 29, 1930.   O. M. TUCKER ET AL   1,756,109
METHOD AND APPARATUS FOR SUPPORTING AND DELIVERING VISCOUS GLASS
Filed Sept. 14, 1925   8 Sheets-Sheet 7

OLIVER M. TUCKER
WILLIAM A. REEVES
INVENTORS.

BY

Edwin P. Lerner
ATTORNEY.

OLIVER M. TUCKER
WILLIAM A. REEVES INVENTORS.

Patented Apr. 29, 1930

1,756,109

UNITED STATES PATENT OFFICE

OLIVER M. TUCKER AND WILLIAM A. REEVES, OF COLUMBUS, OHIO, ASSIGNORS TO HARTFORD-EMPIRE COMPANY, OF HARTFORD, CONNECTICUT, A CORPORATION OF DELAWARE

METHOD AND APPARATUS FOR SUPPORTING AND DELIVERING VISCOUS GLASS

Application filed September 14, 1925. Serial No. 56,214.

Our invention relates to method and apparatus for supporting and delivering viscous glass. It relates particularly to the production of charges of glass which are preformed in relation to the forming receptacle.

Our method contemplates the delivery of molten glass through an orifice, the severing of the glass adjacent the orifice and the application to the delivery orifice and glass therein of an enclosed combustion of gas and air introduced under pressure and burning under pressure. When this is done, all movement of the glass below, within and above the delivery orifice may be stopped. It may then be balanced by the pressure or it may be reversed by adjustment of the apparatus as desired.

This pressure is applied by means of a cup which, after each severing operation, is moved into capping relation to the delivery orifice. When in this capping relation, the cup is supplied with a heating fluid under pressure, and inasmuch as the cup in moving up into capping relation, encloses streams of gas and air in a state of combustion issuing from an annular ring adjacent the delivery orifice.

When this explosive mixture is fed through the annular ring into the cup, the mixture burns under such a pressure that the downward travel of the glass is stopped, partially stopped, or reversed. The pressure in the cup may be regulated by changing the pressure at which the mixture is fed to the ring or by varying the outlet of the fluid from the cup. The glass is heated during extrusion and the glass is under control after each cutting action, and, with other conditions remaining constant, the instant of starting and its starting position in or below the orifice can always be fixed with certainty. This particular method and apparatus are disclosed in our copending application, Serial No. 264,532, filed November 29, 1918, of which this application is a continuation in part.

Our method and apparatus are particularly important when they are used to regulably stop, retard or reverse the glass after each cutting action for periods of time which are variable independently of mold movement and independently of cutting frequency. When used in this manner, they provide very effective regulation for the time period of glass delivery, as set forth in a companion application.

Our present invention contemplates the provision of additional methods and apparatus which constitute improvements upon the subject-matter disclosed in our application, Serial No. 264,532. These improvements include the control of the flow of the combustible mixture from the annular ring in such a manner that the flame may be entirely stopped or restricted during the severing operation.

The apparatus utilized in the performance of our invention may take many different forms and we have shown several different forms of cup and ring structure. We have also shown one form of apparatus that may be used for regulably controlling the operation of the cup structure. This apparatus also includes means for initiating the shearing action and means for determining the periods when combustible mixture is supplied to the fire ring in full force and when the supply is cut off or decreased. In the apparatus shown, the combustible mixture is supplied in full force practically at all times except when the shearing action is taking place. It will be understood, however, that this combustible mixture can be controlled in application so that it is only supplied in full force at the time the cup is in capping relation to the orifice. In the event that it is desired to so control this application of the combustible mixture, we would utilize apparatus such as shown in application, Serial No. 120,429 of September 16, 1916. In this case, it would merely be necessary to use a cup without any perforations in its bottom and connect the hose, which normally supplies the combustible mixture to the cup, to the ring instead. The result will be that the supply of combustible mixture to the ring will be regulably controlled in synchronism with the movement of the cup.

The apparatus preferably used in the performance of our method is shown in the accompanying drawings wherein similar characters of reference correspond with parts and wherein:

Figure 1 is a front elevation of a complete feeding mechanism embodying our invention and showing the combustion cup moved upwardly into capping relation with the ring structure, the timing mechanism for automatically controlling the operation of the various glass feeder parts including the control of combustible mixture fed to the ring structure and the general piping arrangement for connecting the timing mechanism with the operating mechanism.

Figure 5 is a vertical sectional view taken transversely through the spout structure, and showing the relation of the ring structure to the delivery orifice and the manner of projecting an annular flame of gas and air in a state of combustion against the extruding glass.

Figure 6 is a bottom plan view of the bushing and bushing-supporting ring shown in Figure 5.

Figure 7 is a view similar to Figure 5 but showing the annular flame cut off during the severing of the preformed charge of glass and also showing the severing of the charge of glass which is followed by the dropping of the charge as a preformed entity into a receptacle.

Figure 8 is an enlarged front elevation of the timing structure shown in Figure 1, showing the differential valve structure partially in section.

Figure 9 is a bottom plan view of the timer valve structure, showing the valves and connected pipes removed from the timer box and looking in the direction of the arrows at line 9—9 of Figure 8.

Figure 10 is an enlarged vertical section of one of the differential valve structures in the timer.

Figure 11 is a view taken on line 11—11 of Figure 10.

Figure 1:
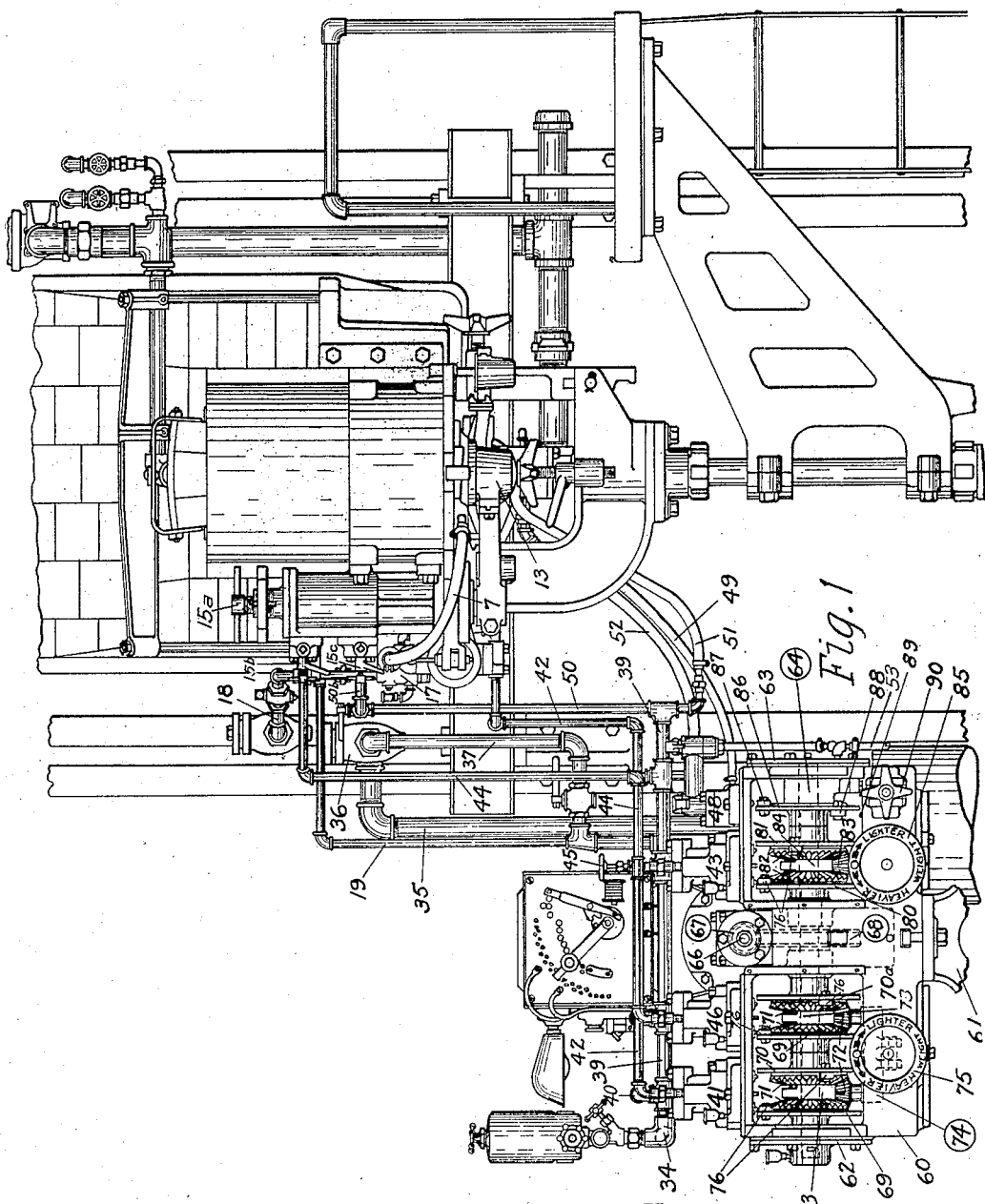

In describing the various parts of our apparatus, it may be best to treat the apparatus as embodying a feeder for forming and delivering charges and timer mechanism for automatically and regulably controlling the operation of such feeder.

Referring particularly to Figures 5 to 7 and 12 to 16, it will appear that glass in a molten condition is contained in a spout which may be designated 1. This spout structure has a delivery channel 2 and an aperture bushing 3 provided with a delivery aperture 4 which is designed to register in proper communication with the channel 2. The lower part of the bushing 3 is specially designed to fit into and be supported by an annular ring structure 5.

This ring structure 5 is provided with a hollow annular compartment 6, which compartment is fed with a combustible mixture of gas and air under pressure. This combustible mixture is fed into the compartment 6 through a suitable pipe 7 and the period of feed and the effective pressure of this combustible mixture are controllable in a manner to be described.

The outlet of the combustible mixture of gas and air from the annular ring 5 is accomplished by means of a series of holes 8 preferably drilled in the lower edge of the ring 5 at such an angle as to direct the continuous annular flame inwardly and downwardly against an extruding column of glass as best shown in Figure 5. The ring structure 5, together with the bushing 3, are preferably designed to be supported by a suitable hinged support 9 of such a structure that the ring and bushing may be swung down from beneath the spout outlet and a new bushing or even a new ring placed therein with little difficulty and at a point comparatively remote from the hot glass.

Figures 2, 3:
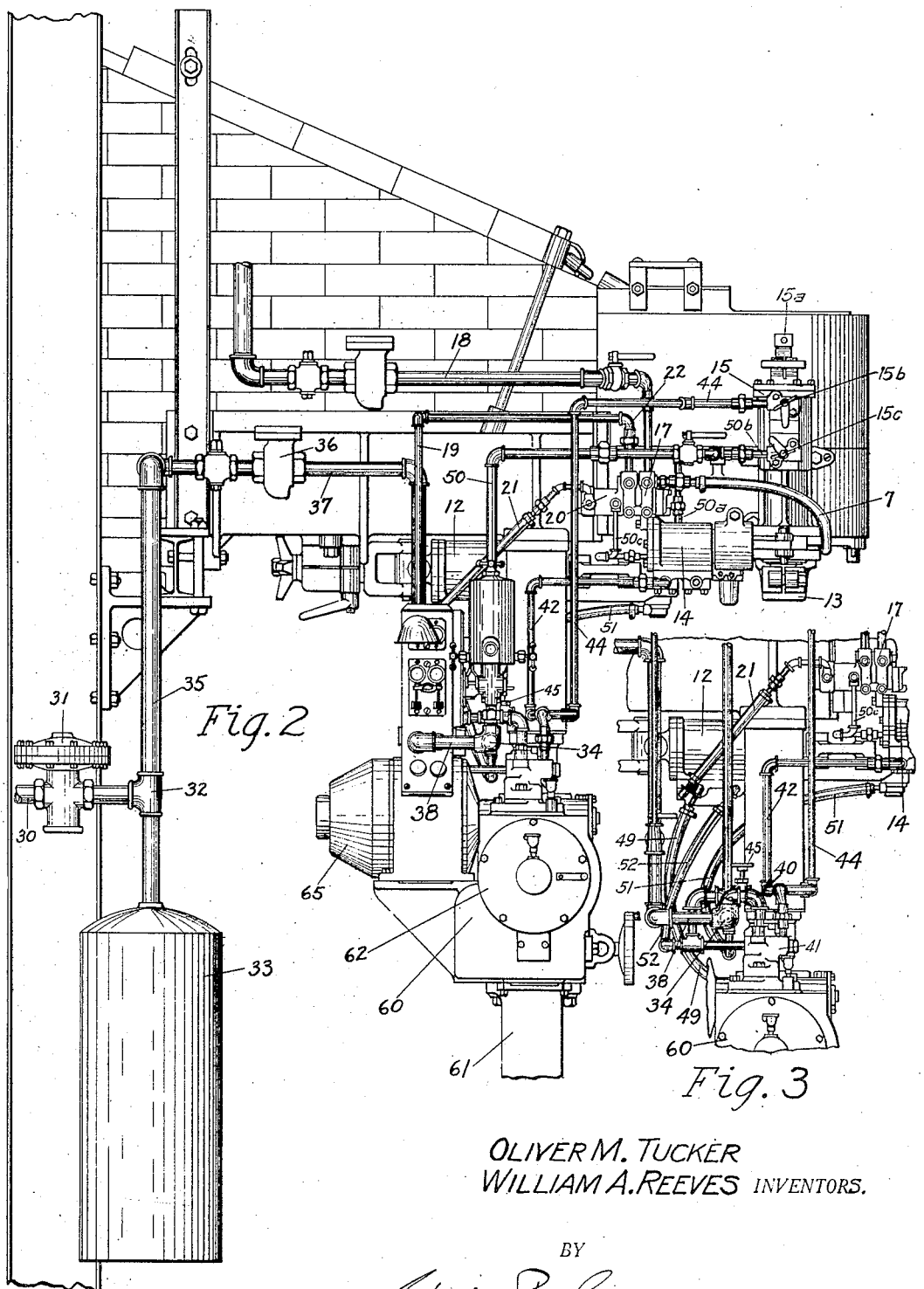
Figure 2 is a side elevation of the structure shown in Figure 1.
Figure 3 is a fragmentary detail view of the structure shown in Figure 2 and illustrating in particular, the manner of conducting the operating fluid to the shear-operating structure and from the shear-operating structure to the injector.

Operating immediately below the bushing and ring structure and preferably carried by the spout 1 is a shear structure, whose blades 10 are carried by knife arms 11. These blades are designed to be successively brought together at regular intervals to sever the viscous glass extruding from the aperture 4. The operation of the shear arms 11 is controlled by the piston and cylinder mechanism 12, as shown in Figures 2 and 3. This piston and cylinder are preferably of differential area construction, the small area of the piston being subjected to constant pressure and the larger area of the piston being intermittently subjected to the operating fluid. The structure and operation of these shear arms and their co-related mechanism are substantially shown and described in our application, Serial No. 392,231, filed June 28, 1920.

Mounted in cooperative relation to the spout 1 and designed to be operated in a certain definite relation to the operation of the shear blades 10, is the cup 13 which is automatically rendered effective for a predetermined period of time after each cutting action, this period of time being variable at will by the adjustment of the timing mechanism to be described. When the shear blades 10 are in severing position, as shown in Figure 7, the flame from the annular ring 5 is automatically restricted or stopped but when the shear blades 10 are moving towards inoperative position, this annular flame is automatically resumed or increased. The cup 13 is given both horizontal and vertical movements in a certain timed relation to the operation of the shear blades 10, the horizontal movement of the cup being controlled by the horizontal piston and cylinder construction 14 and the vertical movement by a piston and cylinder construction which may be designated 15, (Fig. 2). After each operation of the shear blades, the cup swings horizontally into position beneath the feed aperture of the spout and then moves upwardly into desired relation to the bushing and ring structure. When the cup is in capping relation with the spout aperture, the explosive mixture being fed from the holes 8 of the ring 5 is enclosed by the cup in such a manner that the glass in the orifice is stopped, retarded or reversed by the cushion of gases burning under pressure in the enclosure formed by the cup. The position of the cup relative to the ring structure is regulable by a suitable adjustable stop 15ª in the top of the vertical cylinder 15 and the pressure of the mixture within the cup is also regulable. This variability or regulability of the cup and the pressure therein may be effected independently or together. In other words, the position of the cup may be varied to vary the pressure upon the glass, the pressure of the mixture may be varied to vary the pressure upon the glass, or both the position of the cup and the pressure of the mixture may be varied.

An important feature in procuring the proper jets of flame issuing from the holes 8 is the provision of suitable baffle structure 16 adjacent the inlet of the ring structure 5. This baffle structure insures proper distribution of the combustible mixture of gas and air, as best shown in Figures 5, 6 and 7. This baffle 16 extends only a portion of the way around the ring 5 and is positioned opposite the inlet for the gases for the purpose of deflecting a portion of the combustible gases to the opposite side of the hollow chamber 6 in order to produce an even supply of combustible mixture at all of the holes 8. This even supply of combustible fluid produces an even annular sheet of flame for evenly heating the extruding glass and also produces more suitable combustion within the cup when in capping position.

Figure 17:
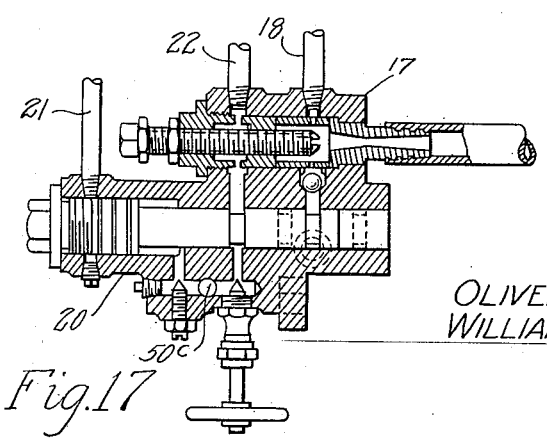
Fig. 17 is a sectional view of an injector suitable for use in my improved feeding apparatus.

The combustible mixture which is fed under pressure to the ring structure 5 through a conduit 7 is properly mixed and controlled by means of an injector 17. (See Figs. 2 and 17.) Gas is fed to this injector 17 by means of a suitable gas main 18, and compressed air under constant pressure is fed to the injector by means of suitable pipes 19 and 22. The pipe 19 is connected to the main supply pipe at a point back of the lubricator to insure that the compressed air fed to the injector will be free from oil, for variable quantities of oil in the air will produce variations of pressure and also form carbon in the orifices. This injector is preferably of the Venturi-tube type.

The vacuum produced by the passing of a jet of air through the Venturi tube will draw the gas into the Venturi tube. The flow of air for the main flame, as opposed to the air for the pilot flame, through the Venturi nozzle, is controlled by means of a piston contained in the cylinder 20. When the piston in the cylinder 20 is in open position, air is free to flow through the Venturi tube to produce a free, full flow of combustible fluid to the ring structure. When the piston in the cylinder 20 is in closed position, only a sufficient amount of air and gas, or gas, is designed to be drawn into the Venturi tube to produce a pilot light, or in other words, just enough combustible mixture is fed through the outlets 8 of the ring structure to form a small pilot flame. We may, if desired, cut off the pilot flame entirely and ignite the gases from the issuing molten glass.

It will be obvious that the closing of the piston within the cylinder 20 of the injector will take place only when the cutting blades are moving forward and into severing position. The air for controlling the movement of the piston within the injector to closed position is introduced through the pipe 21. The constant pressure air for moving and holding the injector piston in open position is introduced though the branch pipe 50ᶜ. This pipe 50ᶜ is a continuation of pipe 50 which supplies constant pressure air to cylinders 14 and 15. The intermittent air introduced through the pipe 21 is introduced in timed relation by the operation of the shears and is controlled by the timing structure, as will be presently described. The injector shown in Fig. 17 and herein described, is substantially that shown and described in an application which we have filed jointly on the 16th day of September, 1916, Serial No. 120,429.

Fluid pressure is employed for controlling the movements of the combustion cup, shearing mechanism, injector mechanism and forming table. As previously described, the cylinders for operating the above units are preferably of the differential-area type and are designed to be moved in one direction by constant pressure air and in the opposite direction by intermittently introduced air, although it will be understood that the cylinders, and particularly the forming table cylinder, may be of any suitable construction. In the performance of our invention, we prefer to introduce the constant air direct from the source of supply to one end of the respective cylinders and the intermittently introduced air is designed to be passed through an intermediate timing structure to be presently described. This timing structure comprises a series of valves which are preferably of the differential area type and which are designed to be automatically actuated to control the admission and exhaust of fluid pressure to and from the large area of the operating piston for the respective units. The form of differential area valve structure that may be here utilized in the performance of our invention is shown in Figures 10 and 11, and is shown and described in an application filed jointly by us on June 30, 1920, Serial No. 392,916.

The fluid pressure utilized for controlling the operation of the various units is supplied from a suitable source of supply 30 through a pressure regulating valve 31, to a T connection 32 and then to a regulated air reservoir 33. From the T connection 32, regulated fluid pressure is supplied to a three-way elbow 34, through pipe 35, strainer 36, and pipes 37 and 38. From the three-way elbow 34, the fluid pressure flows into a common header pipe 39 and from this header pipe to the valves and fluid operating parts of the above mentioned units. This elbow 34 carries the lubricator for distributing oil to the air or other fluid pressure, so that the fluid pressure supplied to the timer, cylinders, shear post and shear blades is oil-laden for lubricating purposes.

A suitable elbow construction 40 connects the header 39 to a valve casing 41. The valve in casing 41 is designed to admit and exhaust fluid pressure air intermittently through pipe 42 to and from the cylinder 14 for actuating the combustion cup horizontally. A suitable elbow construction connects the header 39 to a second valve in casing 43. This valve is designed to supply intermittent fluid pressure to the cylinder 15 through the pipe 44 for initially moving the combustion cup slowly and vertically downward. The air, in passing from the header 39 to the valve in casing 43, is restricted as desired and controlled by means of a suitable valve 45 placed in the piping between the header 39 and the valve casing 43.

A third elbow construction is provided to connect the header 39 with a valve casing 46. The valve in casing 46 is adapted to unrestrictedly admit fluid pressure intermittently from header 39, through valve in casing 46 and through pipes 47 and 44 to the cylinder 15 for moving the combustion cup downwardly at full speed.

A fourth valve in casing 48 is provided to supply fluid pressure air intermittently from header 39 through a conduit 49 for initiating the operation of the shears.

The end of the header 39 is connected to a pipe 50 (see Figures 1 to 4 inclusive), whereby constant fluid pressure is conducted to the cylinders 14 and 15 through pipes 50ᵃ and 50ᵇ for actuating the combustion cup horizontally and vertically into operative position. The pipe 50ᶜ is also a branch of this pipe 50 for the purpose of conducting constant pressure fluid to the injector 17. A pipe 51 is also connected to one end of the header 39 for conducting constant fluid pressure to lubricate the shears and to cool and lubricate the shear blades. A pipe 52 is designed to conduct constant fluid pressure to the shear cylinder 12.

The valve in valve box 48 supplies fluid pressure intermittently through pipe 49 to operate the valve in the valve box on the shear cylinder (see applications, Serial Nos. 392,231 and 392,916). This valve on the shear cylinder then automatically admits and exhausts fluid pressure to and from the shear cylinder for the forward and reverse movement of the shear piston.

Pipe 52 supplies constant fluid pressure to the smaller end of the shear cylinder at all times. Pipe 52 is also the source of fluid pressure supply to intermittently operate against the large end of shear piston. When the valve in the shear valve box is operated by pressure through pipe 49, this valve admits fluid pressure, which is supplied through pipe 52, to the large end of the shear cylinder during the entire length of the forward travel of the piston and then this valve is automatically reversed by the uncovering of a port at that point. This reversal, at the end of the forward stroke of the piston, causes the valve in the shear valve box to exhaust the fluid pressure from the large end of the shear cylinder and the constant pressure from pipe 52 reverses the shear piston and the shear arms are opened.

Pipe 52 supplies intermittent fluid pressure to move a piston forwardly in injector 17. At the time the shear piston is traveling forward to close the shear arms, a portion of the shear valve box is filled with the same fluid pressure that accomplishes this movement. Through pipe 21, this pressure in the shear valve box is connected to the large end of injector cylinder 20 so that the pressure which moves the shear piston forward to close the shears, also moves the injector piston forward to cut off the main air and gas supply as the shears close in a manner to be described. At the completion of the forward stroke of the shear piston, the constant pressure fluid from pipe 52 reverses the shear piston to open the shear arms and hold them open. At the completion of the forward movement of the shear actuating piston, the fluid pressure is exhausted from the larger area of the shear piston head and the shear valve box; this also releases the pressure against the larger area of injector piston and constant pressure from pipe 50° reverses the injector piston simultaneously with the shear piston.

The smaller diameter of the injector piston has an extension thereon. This extension has grooves in it which are registrable with the main air and gas ports so that when the injector piston is operated by pressure on its smaller area, it opens the main supply of air and gas to the fire ring 5 and when it is operated by pressure on its larger area, it closes these main supplies of air and gas. In this manner, as the shear arms close, the injector also closes and shuts off, entirely or in part, the flame around the charge of glass, and as the shears open, the injector piston reverses and allows the previous volume and pressure of combustible mixture to be supplied to fire ring 5.

Figure 12:
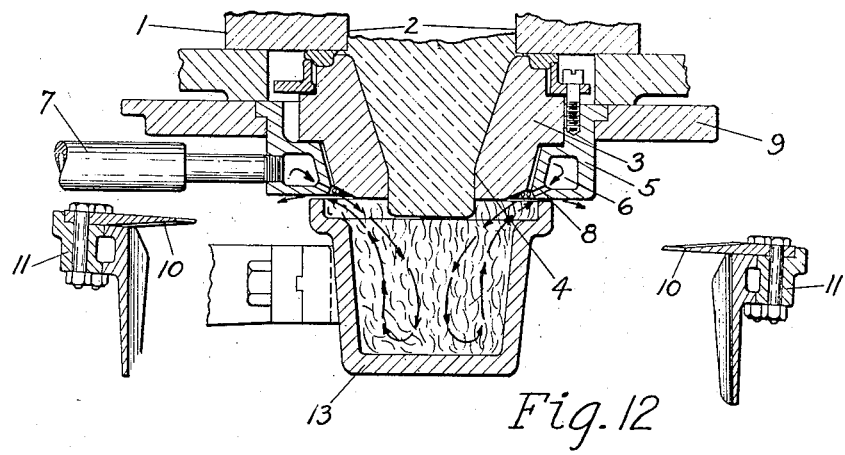
Figure 12 is a view similar to Figures 5 and 7 but showing a modified ring structure and showing the shears retracted and the cup moved into capping relation with the delivery aperture and ring structure for the purpose of enclosing the combustible mixture fed from the ring structure in order to stop, retard, or reverse the flow of glass through the orifice.
Figure 13:
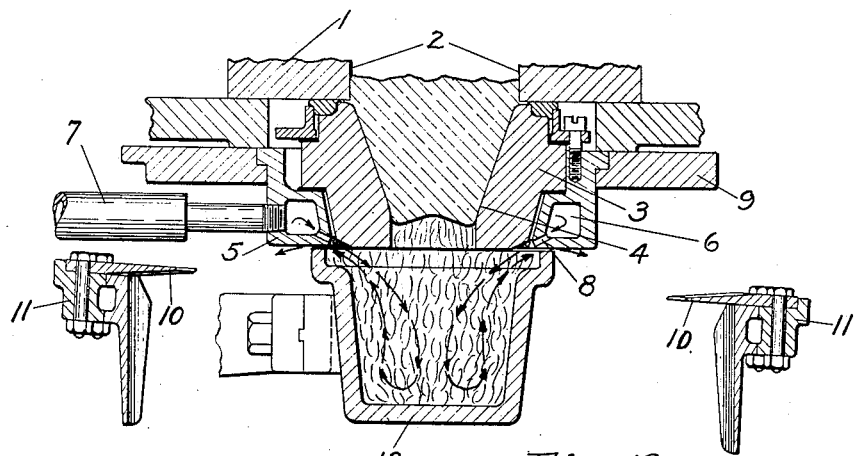
Figure 13 is a view similar to Figure 12 but showing the glass reversed in the orifice as the result of increased pressure in the combustion cup.

The steps just described are clearly illustrated in Figures 5, 7 and 12, wherein Figure 5 shows the annular flame being directed against the issuing glass. Figure 7 shows the annular flame cut off during severance of the glass and Figure 12 shows the annular flame enclosed by the combustion cup to retard, support or reverse the movement of the glass in the aperture.

The timing mechanism which we employ for intermittently supplying fluid pressure to the combustion cup, shears, and injector operating cylinder is contained in the timing box 60 (see Figures 1, 2 and 8). This timing box is supported upon a suitable standard 61. The ends of the timing box are formed by circular plates 62 and 63, each plate being provided with a suitable bearing in which is journaled a shaft 64 which is adapted to carry a plurality of cam plates. The shaft 64 is driven from a source of power by any suitable gearing and in the present structure, is shown as being driven from a variable speed motor 65, through a shaft 66, worm 67 and worm wheel 68, the worm wheel being mounted upon the shaft 64, as best shown in Figures 1 and 8.

Mounted upon the shaft 64 are cam plates 69 and 69$^a$ which are rigidly fastened to the shaft by any suitable means. Also mounted upon the shaft 64 are loosely mounted cam plates 70 and 70$^a$. The cam plates 69 and 70 and 69$^a$ and 70$^a$ are preferably arranged in pairs carrying gears 71 upon their opposing faces. These gears 71 of each pair are designed to mesh with pinions 72 which are mounted upon depending pins carried by blocks 73. These blocks 73 are capable of movement about the rotating shaft 64. The ends of the depending pins of the blocks 73 are secured in a suitably provided yoke member 74 so that the pinions 72 may be adjusted simultaneously and in perfect unison, if desired, by a single adjusting movement of a hand wheel 75.

The cam plates 69, 69$^a$, 70 and 70$^a$ support circumferentially adjustable cam rollers 76 which are adapted to contact with and unseat poppet valves contained in the valve casings 41 and 46, as best shown in Figures 8, 10 and 11, and as will be described.

The valve structure contained in each of the valve casings 41, 43 and 46 are substantially identical with the exception hereinafter to be noted, and for this reason, an understanding of each of these structures may be readily had by reference to Figures 9, 10 and 11 which show the construction of the valve structure contained in valve casing 41.

The casing 41 is constructed to contain a differential area piston 91 which is provided with two conical valves 92 and 93 and which carries a piston head construction 94 upon its base. The valve 92 is designed to cooperate with a valve seat 95 and the valve 93 is designed to cooperate with a valve seat 96. In between these valve seats 95 and 96 there is provided a passage 97 which is connected at its upper end to the pipe 42 that leads to the horizontal cylinder 14 and, particularly, to the space in front of the larger area of the piston contained in such cylinder.

Below the valve seat 96 there is provided a passageway 98 that communicates with the exhaust ducts 99 (see Figures 9 and 11). The exhaust ducts 99 lead directly into the timer box and the exhaust air which they deliver into the timer box is sufficiently laden with oil to effectively lubricate the gears, rollers and pins of the timing mechanism.

The poppet valves 100 and 101 are provided as supplemental to the differential area valve piston 91. These poppet valves are held normally against their seats by suitably provided springs. These poppet valves are each provided with a depending stem which extends downwardly through the top of the timer box and into juxtaposition to the cam plates 69 and 70 which are rotating in opposite directions through the medium of the pinion gear 72. The lower ends of the poppet valve stems are so located that they will be elevated by the rollers 76 carried on the respective cam plates. Constant fluid pressure is delivered to the chamber 102 above the valve seat 95 by the pipe 40. The chamber 102 is provided with a by-pass 103 which leads to the poppet valve 101.

As the cam plate 70 brings its roller into contact with the stem of poppet valve 101 and unseats it, fluid pressure is admitted to the larger face of the differential valve piston 91 via chamber 102, by-pass 103, poppet valve 101 and passage 104. The admission of pressure to the large face of the piston overcomes the pressure on its upper or smaller face, causing the piston 91 to move upwardly to seat the valve 93 and unseat the valve 92. The air from chamber 102 then flows past valve 92 into passage 97 and thence through pipe 42 to the larger area of the piston in the horizontal cup cylinder. In the continued operation of the timer, the roller on cam plate 69 comes in contact with the stem of poppet valve 100, unseating it. As this poppet valve is unseated (the poppet valve 101 now being seated), the pressure on the larger face of the differential valve piston 91 is exhausted into the timer box via passage 105, poppet valve 100 and exhaust passage 106, whereupon the pressure acting on the upper or smaller face of the differential valve piston 91, moves such piston downward to seat valve 92 and unseat valve 93. The result of this is that the pressure on the larger face of the piston in the horizontal cup cylinder, is exhausted into the timer box via pipe 42, passage 97, valve 93, passage 98 and exhaust ducts 99.

Thus, the valve structure in the valve casing 41 controls the admission and exhaust of fluid pressure intermittently into and from the large end of the cylinder 14 so as to effect the horizontal swinging movement of the combustion cup 13, first in one direction (away from the opening 4 in the spout), and then in another (toward the opening 4 in the spout). The cams and rollers for actuating the poppet valves in the valve casing 46 operate in a manner similar to the cams and rollers for operating the valve in the casing 41.

In the structure, as shown in Figure 9 of the drawings, the only structural difference between the valve structure in the casing 41 and that in the casing 46 is that a plug 107 is inserted in each of the exhaust ports 99 in the valve structure of casing 46, thereby preventing an exhaust through the valve casing 46 via pipe 47 and ports corresponding to ports 97, 98 and 99 of Figure 11. The purpose of the plugs 107 will be described later.

It will be understood that the adjustment of the adjusting wheel 75 serves to provide a greater or lesser period in between the actuation of the two poppet valves of each pair in the casings 41 and 46. Since the wheel 75 controls this period, both as to the horizontal movement and as to the vertical movement of the cup, the result is that the period during which the cup remains in capping position and the period during which it remains away from capping position, are adjustable relatively at will. The effect on the glass is that by the adjustment of this wheel 75 and its consequent spacing of the roller cams, the period of stoppage of extrusion of the glass and the period of extrusion of the glass may be relatively regulated.

The timing mechanism for controlling the slow downward movement of the combustion cup 13 may comprise a cam plate 80 rigidly mounted upon the shaft 64 and a cam plate 81 loosely mounted upon the shaft 64, the said cam plates 80 and 81 being arranged in a pair similar to the cam plates 69 and 70 as above described. These cam plates 80 and 81 are provided upon their adjacent faces with bevel gears 82, which gears in turn mesh with a pinion 83. This pinion 83 is mounted upon a suitable pin carried by a block 84, which is mounted for movement upon the rotating shaft 64. The position of the pinion 83 and the consequent relation of the cam plates 80 and 81 is controlled by an adjusting wheel 85 in a manner similar to the adjusting wheel 75. The cam plates 80 and 81 also carry rollers 76 for actuating poppet valves similar to and in the same manner as poppet valves 100 and 101 above described.

The shaft 64 also carries a single cam plate 86 which is rigidly mounted upon said shaft. This cam plate 86 carries a cam roller 87 which operates at certain predetermined intervals to unseat the poppet valve contained in the valve casing 48, which in turn, admits fluid pressure into the valve box of the shear cylinder 12 for initiating the closing of the shear structure. The closing of the shear structure results in the admission of fluid pressure to the conduit 21 for initiating the closing of the piston valve of the injector 17, as previously described. The cam plate 86 also is provided with a roller 88 for actuating at predetermined intervals a poppet valve 89 contained in a valve casing (not shown). This valve casing is concentrically adjustable with respect to the cam plate 86 by means of a hand wheel 90 and its cooperating mechanism, and controls the intermittent admission of fluid pressure to the pipe 53 leading to the trip-off means of the forming machine. The action just referred to and the valve structure involved, pertains to the means for initiating the movement of the forming machine in a certain timed relation to the previously described operating units.

The valves in casings 43 and 46 and their associated mechanism are designed to cooperate, under certain conditions, or to operate independently under other conditions, in the control of the vertical movement of the combustion cup. These valve structures may cooperate to cause the cup 13 to move downwardly at a slow rate of speed to a predetermined point and then to move downwardly the remainder of the distance at a higher speed, or they may operate independently so that the entire downward movement will be at a uniform fast or slow rate as desired.

In the structure shown in the drawings, particularly Figures 1 to 4 and 9 to 11, the timer mechanism is so arranged as to cause the cup 13 to move downwardly initially at a slow rate of speed, and then to complete its downward movement at a high rate of speed, and to then swing horizontally to an inoperative position. On the reverse movement, the cup 13 swings horizontally beneath the spout opening 4 and then moves upwardly at such a uniform rate of speed as to meet the conditions of use. Where the cup is initially lowered slowly, the pressure in the cup will be slowly progressively reduced.

Figure 4:
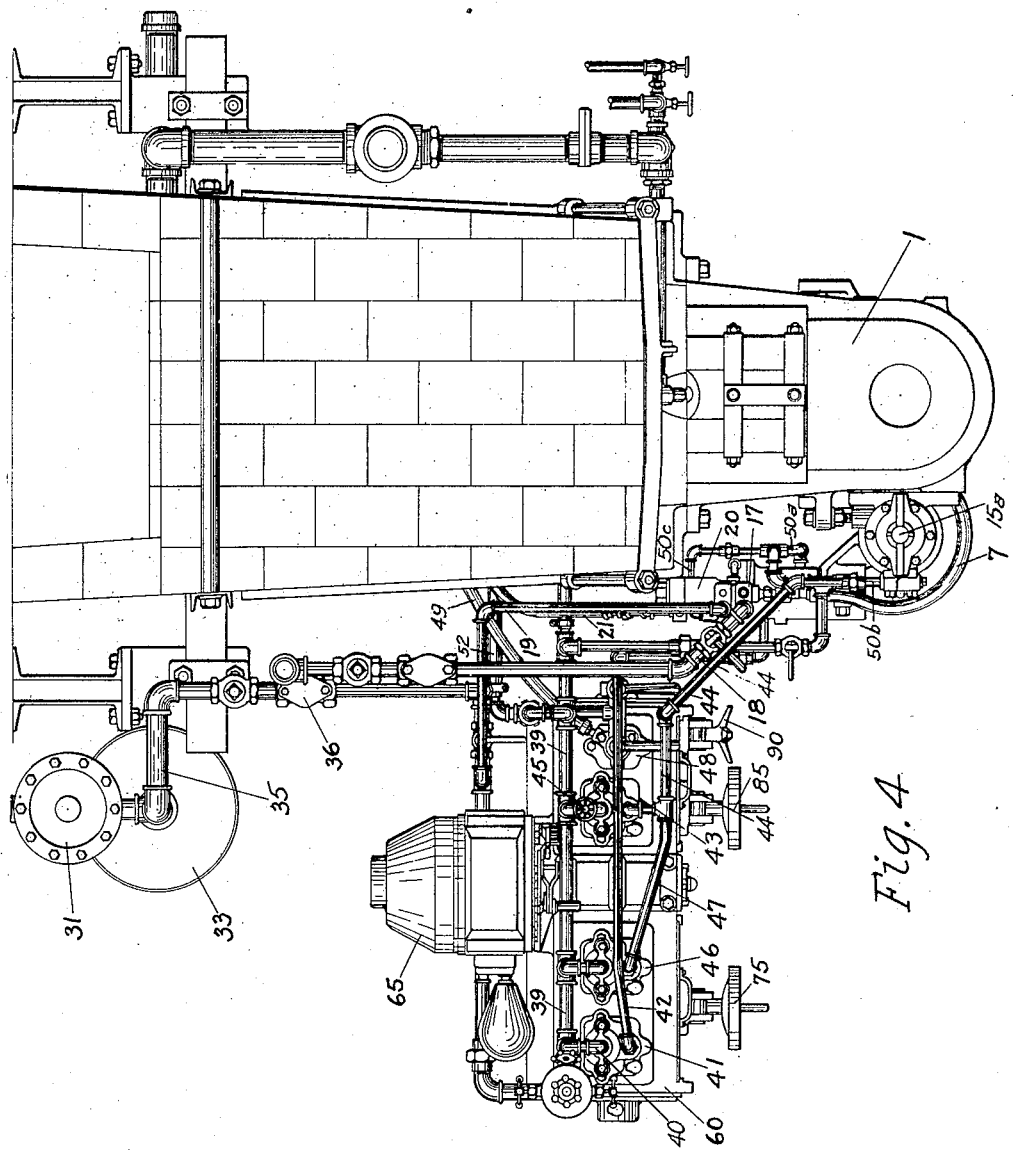
Figure 4 is a plan view of the structure shown in Figures 1 and 2.

In the drawings, the cooperative relation between the valves of casings 43 and 46 and the initial slow movement of the cup are accomplished, preferably, by placing the control of the instant of beginning of downward movement of the cup 13 upon the loose cam 81 and its roller 76 and by interposing the regulating valve 45 in between the header 39 and the valve casing 43 (Figure 4). The valve 45 is of such construction that it may be set to restrict the flow of air to the valve casing 43 to any desired extent. Also, it is desirable that the rollers 76 on the fixed cams 69ª and 80 be set so as to operate their respective poppet valves at the same instant. With this arrangement, the roller on cam plate 81 trips its poppet valve first to initiate downward movement of the cup by a restricted supply of air, and at a given and adjustable instant thereafter the roller on cam plate 70ª operates its poppet valve to supply an unrestricted supply of air. At the time the roller on cam plate 81 initiates movement of the cup, the differential valve piston, in casing 46, is in exhaust position, therefore, with the above arrangement, the exhaust ports 99 in the casing 46 are plugged, as already described, to prevent exhaust of the intermittent air through pipe 47 and valve casing 46 when the valve structure in casing 43 is actuated to supply air to the vertical cup cylinder. In the operation of the above, assuming that the cup is in capping position, the roller on cam plate 81 trips its poppet valve, thereby actuating the differential valve piston in casing 43 so that fluid pressure from the header 39 flows slowly past the regulating valve 45 through the valve structure in the casing 43 and thence through pipe 44 to the larger face of the piston in the vertical cylinder 15, causing such piston to start to move and to move slowly. Then, at a given and adjustable point in the slow downward movement of the cup, the roller 76 on the cam plate 70ª operates its poppet valve, thereby moving the differential valve piston in the casing 46 so as to unrestrictedly deliver fluid pressure from the header 39 through the pipes 47 and 44 to the larger face of the piston in the vertical cylinder, causing the cup to complete the downward movement rapidly. As the cup reaches its lowermost position, the roller 76 on cam plate 70 actuates its poppet valve to cause fluid pressure to be delivered to the horizontal cylinder to move the cup to inoperative position.

The cup is moved horizontally and upwardly into operative position by exhausting the intermittent fluid from the larger faces of the pistons in the horizontal and vertical cylinders. This is accomplished upon the continued rotation of the timer when the roller 76 on cam 69 actuates its poppet valve to set the valve structure in exhaust position, as already described. The cup then moves horizontally, whereupon the rollers 76 on cams 69ª and 80 strike their respective poppet valves and set their respective valve mechanisms in exhaust position, whereupon the pressure on the larger face of the piston in the vertical cylinder is exhausted via pipe 44 and the exhaust ports 99 in valve casing 43, there being no exhaust through the exhaust ports 99 in the valve casing 46 because they are plugged. As the above actions take place, the cup swings horizontally beneath the spout opening 4 and then moves upwardly to its capping position.

When it is desired that the entire downward movement of the cup 13 be with considerable rapidity, the initial slow downward movement being cut out, the regulating valve 45 may be closed to cut off communication between the header 39 and valve casing 43 and the plugs 107 removed from the exhaust ports 99 in the valve casing 44. The result of this is that the instant of beginning of downward movement of the cup 13 will be determined by the time that the roller 76 on cam plate 70ª operates its poppet valve. Of course, it is understood that the hand wheel 75 will be operated to adjust the loose cam plate 70ª to the proper position or the roller 76 may be moved to the desired position on the cam plate 70ª. With the above arrangement, when the roller 76 on cam plate 70ª operates its poppet valve, an unrestricted supply of air is admitted through pipes 47 and 44 to the vertical cylinder 15 with the result that the cup 13 is moved downwardly with a uniform rapid movement. It is to be understood that in any case, the flow of air from both faces of the piston in the vertical cylinder 15 may be regulated independently and supplementally by adjusting the needle valves $15^b$ and $15^c$ on the vertical cylinder to further regulate the speed of either or both the upward and downward movements of the cup 13.

Another manner of adjusting our apparatus so as to cause the entire downward movement of the cup 13 to be with considerable rapidity is to open the regulating valve 45 to its full extent so that there is no restriction between the header 39 and the valve casing 43. In this case, when the roller 76 on cam plate 81 operates its poppet valve, the cup will start to move and its movement will be rapid instead of slow as previously described, and when the roller 76 on cam plate $70^a$ trips its poppet valve, no change in rate of movement will take place. The remainder of the operation is as previously described.

Still another way of accomplishing a fast movement for the cup 13 throughout its downward movement, is to remove the valve casing 43, rendering the cam plates 80 and 81 inoperative, and remove the plugs 107 from the exhaust ports 99 in valve casing 46. In this case, the operations of the cup 13 will be controlled by the cam plates 69, 70, $69^a$ and $70^a$ in the manner already made clear.

As previously described, the period of actuation and the relative time of actuation of the valves in casings 43 and 46 may be varied by adjusting the wheels 85 and 75.

In operation, the molten glass flows from the tank into the spout to the feed aperture thereof. A preferably continuous supply of combustible fluid is projected through the holes 8 of the annular ring 5. A portion of the glass in the spout is extruded through the feed aperture for a predetermined period of time, this extrusion being effected either by the head pressure of the glass, by applied fluid pressure upon the glass, or by a plunger which reciprocates axially in the glass immediately above the opening. This extrusion of the glass through the opening continues for a period of time which is predetermined by the action of the combustion cup and its controlling mechanism.

During this extrusion, the annular flame from the ring structure impinges against the extruding glass. When the proper weight of glass is below the severing plane, the shearing action is effected. The result is that a portion of the extruded glass is severed and permitted to drop into the mold, guides being preferably provided in depending relation to the shear blades to insure that the charge will be delivered endwise and will alight upon its nose in the mold.

The moving together of the shear blades is accompanied by the restriction or interruption of the flame from the ring structure. In other words, this flame may be merely restricted so as to leave a pilot light, or it may be entirely cut off, as desired, and reignited by the heat from the extruding glass. When the shear blades are retracted after severing the glass, the full volume of the annular flame is again automatically brought into play. Then the combustion cup starts to move horizontally to a position below the feed aperture and then upwardly until in normal position, it nearly abuts the bottom of the spout or ring structure. This upward movement of the combustion cup encloses the annular flame projected from the ring structure to produce an enclosed combustion within the combustion cup, the pressure of the enclosed combustion being preferably maintained or varied by the degree of opening between the cup and the ring structure.

The glass in the aperture may be counterbalanced, given a reverse movement, or it may be permitted to have a retarded or non-retarded descent. After a predetermined proper interval, the cup is automatically lowered and swung horizontally out of position, the annular flame from the ring structure continuing and being directed against the extruding glass. Then after a further predetermined interval, the shear blades are brought together to sever the portion of glass that has extruded and the flame is reduced or interrupted. This completes the cycle of operation. Attention has already been called to the fact that the mechanism which times the movement of the shears and the combustion cup also times the starting of the press.

It is important to note that our apparatus provides for the continuous, even, direct heating of the extruding glass immediately below the orifice and from the time of its beginning of extrusion until the moment of severance. It is further important to note that this annular flame is automatically resumed immediately after severance so as to form the enclosed combustion within the combustion cup while the combustion cup is in capping position. It will be understood that the annular flame from the ring structure may be continuous but we preferably desire to interrupt this flame during severance in order to protect the shear blades from the heat of the flame.

Figure 14:
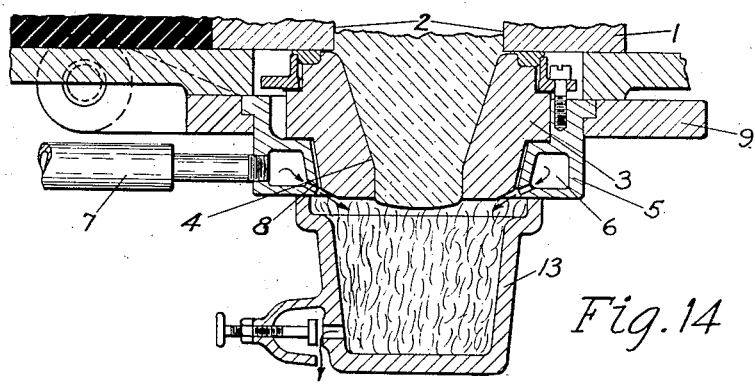
Figure 14 is a view similar to Figures 12 and 13 showing the top of the combustion cup in abutting relation with the bottom of the ring structure, the fluid escaping through a regulable valve in the wall of the cup.

The modification illustrated in Figure 14 is similar to the structure illustrated in Figures 5 to 7, 12 and 13, but instead of merely moving the cup close to the bottom of the ring structure, the cup in this figure is shown moved into contacting relation with the ring structure and the combustible fluid which enters the combustion cup from the ring structure and burns therein under pressure is allowed to escape through a regulable valve in the wall of the cup. It will be obvious that the pressure of the combustible mixture in the cup may be varied by this valve structure.

Figure 15:
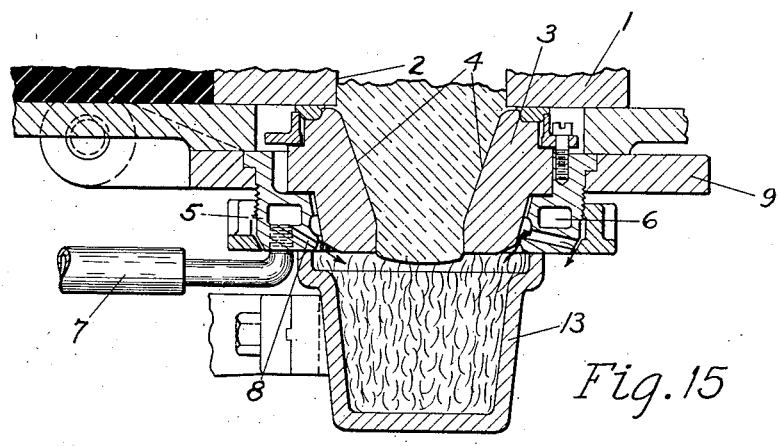
Figure 15 is a sectional view of a spout and combustion cup taken on line 15—15 of Figure 16 wherein the explosive mixture is fed through a ring surrounding the delivery orifice into the cup and then out through the ring, the outlet being controlled by a wedge ring which may be adjusted to throttle the outlet ports to any desired degree.
Figure 16:
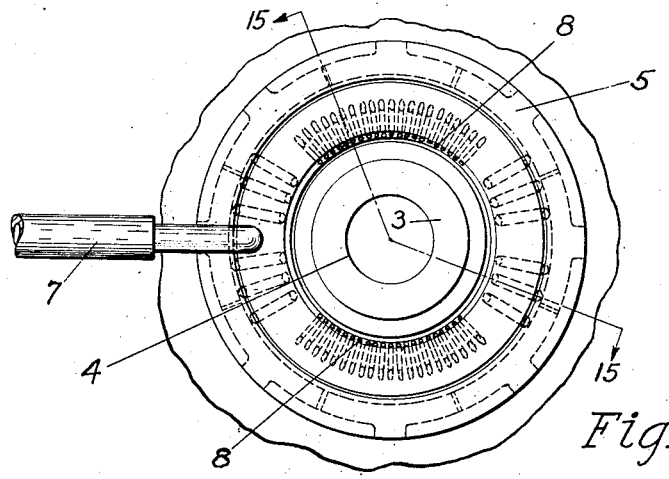
Figure 16 is a bottom plan view of the structure shown in Figure 15 after the cup has been swung to inoperative position.

The modification shown in Figure 15 is similar to that shown in Figure 14. The cup is brought into contacting relation with the bottom of the ring structure and the outlet of the burnt gases is controlled and varied by means of the wedge ring structure which, as shown, may be adjusted to throttle the outlet ports to any desired degree.

In the drawings, we have shown our downward flame in conjunction with a feeder wherein the glass is extruded through an opening in the bottom of the spout merely by the head pressure of the glass above this opening. It will be understood that it is our intention that this downward flame be also utilized in conjunction with feeders wherein part or all of the extrusive action of the glass through the delivery outlet is produced by the use of a plunger that reciprocates within the glass in axial relation to the delivery outlet, as disclosed in our application Serial No. 249,422, filed August 12, 1918, and our application Serial No. 605,751, filed December 9, 1922. In using the present downward flame in conjunction with such a plunger as that shown in the above-mentioned applications, it will be appreciated that this flame and combustion cup are merely substituted for the combustion cup shown and described in those above-mentioned plunger applications. A suitable timing unit for operating the accelerating plunger may be provided, this timing unit being desirably contained in the timer box 60 and being preferably of the type disclosed in our application Serial No. 605,751 of December 9, 1922.

There are numerous advantages in the use of this downward flame structure. In the first place, in the making of certain classes of blown ware, the extruding of the glass through the clay orifice frequently causes scratches or marks upon the side of the glass column. These scratches or marks are minute but if subjected to the atmosphere, they become set and eventually appear in the completed ware. This flame flowing down along the sides of the glass column and in contact therewith, serves to remelt the surface of the glass and eliminate these scratches so that the ware produced is free from defects which would otherwise be caused thereby.

There are numerous other features of advantage, such as the provision of means for readily regulating the pressure within the combustion cup and the fact that it is possible to prolong the time of application of the flame to the column of glass.

Having thus described our invention, what we claim is:

1. The method of delivering glass through a delivery orifice, which comprises feeding the glass through the orifice, applying downwardly directed unconfined fluid under pressure to the issuing glass, severing a portion of the glass and restricting the fluid during the severing operation, and then enclosing the supply of fluid to retard or stop the movement of glass in the orifice.

2. The method of delivering viscous glass, which comprises superimposing a mass of such glass above a delivery orifice, successively extruding and severing portions of such glass by mechanical shears and applying an inwardly and downwardly directed unconfined fluid under pressure to the glass before severance, restricting the flow of the unconfined fluid during severance and enclosing such fluid after severance.

3. The method of delivering glass through a delivery orifice, which comprises feeding the glass through the orifice, applying inwardly directed hot fluid to the glass, severing a portion of said glass, varying the supply of said fluid during said severance, and enclosing said fluid after the severing operation with a container wherein the fluid accumulates under pressure, the initial supply of fluid having been restored.

4. The method of delivering glass through a delivery orifice, which comprises projecting an annular flame inwardly adjacent the orifice, feeding glass through said orifice and said annular flame, severing a portion of said glass and restricting said annular flame during said severing operation.

5. In a glass machine, a delivery orifice for glass, an annular ring positioned adjacent said orifice for projecting a heating fluid beneath said orifice, severing means periodically acting beneath the ring, and a cup movable into position for enclosing said heating fluid.

6. In a glass machine, a delivery orifice for glass, an annular ring positioned adjacent said orifice for projecting a heating fluid beneath said orifice, shears periodically acting beneath the ring, and a cup movable into capping position with said orifice for enclosing said heating fluid.

7. In a glass machine, a delivery orifice for glass, shear structure for periodically severing mold charges from the issued glass below the orifice, means for directing fluid under pressure towards a converging point beneath said orifice and means controlled to act periodically in timed relation to the operations of said severing means for varying the supply of said fluid.

8. In a glass machine, a delivery orifice for glass, an annular perforated ring positioned adjacent said orifice, shears periodically acting beneath the orifice, means for supplying said ring with a combustible fluid for projecting an annular flame against the issuing glass, and means controlled to act periodically in timed relation to the operations of the severing means for varying the supply of said fluid.

9. In the art of glass feeding, the method of delivering successive lumps of glass from an orifice, which comprises cutting the glass successively beneath said orifice, forcing the glass back in said orifice to regulable degrees and then applying an annular flame to the glass as it issues from the orifice.

10. In the art of glass feeding, the method of delivering successive lumps of glass from an orifice which comprises cutting the glass successively beneath said orifice by mechanical shears, forcing the glass back in said orifice by an enclosed fluid pressure after each cutting operation and directing an annular volume of unconfined fluid pressure inwardly and downwardly against the issuing glass.

11. A machine for delivering charges of molten glass, comprising a bushing through which the glass passes, a hollow supporting ring for said bushing, said ring being provided with an inlet in its outer wall for a fluid under pressure and a plurality of fluid ducts, and severing means below the supporting ring spaced around the ring, a baffle in said ring between said inlet and the adjacent ducts, a cup movable to position to confine pressure fluid from said ducts against the glass at the lower end of said bushing.

12. The method of delivering glass through a delivery orifice which comprises feeding the glass through the orifice, applying inwardly directed unconfined fluid under pressure to the glass, intermittently stopping the supply of said fluid, severing the glass during such intermission, enclosing the orifice, and accumulating the fluid under pressure within the enclosing means after each severing operation.

13. The method of delivering glass through a delivery orifice, which comprises feeding the glass through the orifice, applying fluid under pressure to the issuing glass, stopping the application of fluid, severing the issued glass during the stoppage of the fluid, then resuming application of the fluid and enclosing the fluid by means separate from the fluid applying means to retard or stop the movement of glass in the orifice.

14. The method of delivering viscous glass, which comprises superimposing a mass of such glass above a delivery orifice, successively extruding and severing portions of such glass, applying an open fluid under pressure to the glass before severance, stopping the supply of fluid during severance, and enclosing said fluid after severance by means separate from said fluid applying means.

15. The method of delivering glass through a delivery orifice which comprises feeding the glass through the orifice, applying a downwardly directed unconfined hot fluid to the glass while it issues before severing, severing a portion of said glass, stopping the supply of said fluid during severing, and enclosing said fluid after severing with a container wherein the hot fluid accumulates under pressure.

16. The method of delivering glass through a delivery orifice which comprises annularly projecting a fluid inwardly adjacent the orifice, feeding glass through said orifice and said fluid, severing a portion of said glass, and stopping said fluid during severing.

17. In a glass machine, a delivery orifice for glass, an annular ring positioned adjacent said orifice for annularly projecting a heating fluid beneath said orifice, and a cup movable into capping position with said orifice for enclosing said fluid and severing means periodically acting beneath said annular ring.

18. In a glass machine, a delivery orifice for glass, an annular perforated ring positioned adjacent said orifice, means for supplying said ring with a fluid for annularly projecting a fluid against the issuing glass, and a means acting in timed relation to the operation of the severing means for stopping the supply of said fluid.

19. A machine for delivering charges of molten glass comprising a bushing through which the glass passes, a hollow supporting ring for said bushing provided with an inlet for pressure fluid and a plurality of fluid ducts for directing fluid towards a point beneath said bushing, a baffle in said ring between said inlet and the adjacent ducts, a cup movable to position to confine pressure fluid from said ducts against the glass at the lower end of the bushing, mechanical shears for severing said glass, and means for varying the supply of said fluid.

20. Apparatus for feeding molten glass, comprising a container for the glass having a downwardly opening submerged discharge outlet, stationary heating means adjacent to and surrounding said outlet for preventing the accumulation of chilled glass at said outlet, a cup movable to and from position below said outlet, means for causing said cup to assist in controlling the issue of glass through said outlet, and means for severing mold charges from the glass below said outlet.

21. Glass feeding apparatus comprising a delivery orifice, shears acting periodically beneath the orifice, a cup movable between operative and inoperative positions, and means separate from the cup for directing a supply of fluid to a point beneath said orifice whereby it will be enclosed by the cup when in operative position.

22. Glass feeding apparatus comprising a discharge orifice, means governing the extrusion of glass through the orifice, shears for severing charges of glass, means positioned adjacent said orifice for directing fluid inwardly and downwardly beneath said orifice, and timing means for controlling the actuation of said extrusion governing means and shears and for controlling the supply of fluid to said fluid directing means.

23. Glass feeding apparatus comprising a discharge orifice, an annular perforated ring positioned adjacent said orifice, means for supplying said ring with a fluid for projection against the issuing glass, means for intermittently enclosing said fluid, mechanical severing means, and means for carrying the supply of said fluid in cooperation with the actuation of the enclosing and severing means.

24. The method of feeding molten glass from a downwardly opening outlet, that comprises causing glass to issue from said outlet, thrusting shear blades through the discharged glass to sever a mold charge therefrom, withdrawing said shear blades, directing an annular stream of gaseous fluid downwardly adjacent to said outlet, and, while said shear blades are withdrawn, confining said fluid sufficiently to produce a pressure acting upwardly upon the glass at said outlet.

25. The method of controlling the discharge of molten glass from a downwardly opening outlet, that comprises directing a flame downwardly adjacent to said outlet and confining said flame sufficiently to produce a pressure acting upwardly upon the glass at said outlet.

26. Glass feeding apparatus comprising a container having an outlet, stationary means for heating the glass adjacent to said outlet, a movable element cooperating with said heating means to produce pressure for restraining the issue of glass from said outlet, means for periodically moving said element, and means for regulating said pressure.

27. Glass feeding apparatus comprising a container having a downwardly opening discharge outlet, a stationary annular burner surrounding said outlet below said container, shears for severing mold charges from the glass issuing from said outlet, a cup adapted to receive flame from said burner and to confine said flame to produce a pressure for restraining the issue of glass from said outlet, means for periodically swinging said cup between a flame-receiving position beneath said burner and a lower position laterally displaced from said burner, and means for permitting the escape of products of combustion from said cup to a regulated extent when said cup is in its flame-receiving position.

28. The method of feeding molten glass that comprises causing glass to issue downwardly through an outlet, periodically severing charges from the issued glass, surrounding the issuing glass with a downward flow of gas, and periodically producing an upward blast against the remaining glass after each severance.

29. The method of feeding molten glass that comprises passing the glass through an outlet in the bottom of a receptacle containing the same and within a downwardly directed curtain of flame surrounding said outlet, severing the resulting gather while the said gather is moving toward a receptacle and causing it to drop, and applying an upward gaseous pressure to the remaining glass after the severance.

30. The combination of a container for molten glass having a downwardly directed discharge outlet through which the glass issues, a burner arranged to envelop the issuing glass in a downwardly moving flame, means to periodically sever the glass adjacent the outlet, and means brought into activity periodically after each severance to apply upwardly directed flame against the remaining severed end of glass.

31. Glass gathering apparatus comprising a molten glass container having a delivery aperture, means for applying a combustible mixture burning under pressure to said aperture, and other means for enclosing the zone to which such mixture is delivered in a manner to maintain pressure.

32. Glass gathering apparatus comprising a molten glass container having a delivery aperture, means for applying a combustible mixture burning under pressure to said aperture, and a cup for enclosing the zone of combustion and maintaining pressure in such zone.

33. The method of delivering mold charges of glass from an orifice, which comprises surrounding the orifice with a continuous flame, flowing the glass through the flame, periodically severing mold charges from the glass, and confining the flame after each severing action to increase the pressure of the flame against the glass and thus to support the latter.

34. The method of delivering charges of glass, which comprises surrounding an outlet for the glass with a continuous flame, flowing the glass through the outlet in contact with the flame, periodically severing charges from the issued glass, and confining the flame under pressure beneath the orifice after each severing operation to temporarily sustain the glass.

35. The method of feeding glass through an orifice, which comprises surrounding the orifice with a downwardly directed heating fluid having a temperature higher than that of the issued glass, and periodically confining a portion of said heating fluid beneath the glass to retard its normal flow.

36. The method of feeding molten glass through a downwardly opening orifice, which comprises surrounding the orifice with a continuous flame, and periodically confining a heating fluid beneath the orifice about the end of the issuing glass.

37. The method of controlling discharge of glass from an orifice, which comprises surrounding the orifice with an annulus of downwardly moving pressure fluid, discharging glass downwardly through such annulus, periodically severing charges from the issued glass, and temporarily supporting the glass stub left after each severing action by a fluid pressure support.

38. The method of controlling discharge of glass from an orifice, which comprises interposing a downwardly and inwardly directed heating fluid having a temperature higher than that of the issuing glass between the issuing glass and the surrounding air, periodically severing mold charges from the issued glass, and temporarily supporting the stub left after each severing operation by a confined pneumatic supporting device.

39. The method of controlling discharge of glass from an orifice, which comprises subjecting the glass to a ring of inwardly converging flame as the glass issues from the orifice, and periodically confining part of said flame beneath the orifice to regularly increase the pressure thereof on the issuing glass so as to retard the movement of the glass as desired.

40. The method of controlling the discharge of molten glass from a downwardly opening outlet, which comprises directing a gaseous fluid downwardly adjacent to said outlet, confining said fluid sufficiently to produce a pressure acting upwardly on the glass at the outlet, and regulating said pressure on the glass by permitting the escape of a regulable part of said fluid.

41. The combination with a container for molten glass having a discharge orifice in its base, of a burner adjacent to the orifice arranged to supply a heating flame surrounding the issuing glass, and other means for periodically confining pneumatic pressure at the orifice against the issuing glass.

42. Glass feeding apparatus comprising a container having an outlet, means for projecting a heating blast having a temperature higher than that of the issuing glass against the glass at the outlet, and means for confining pressure fluid in the vicinity of the outlet against the glass issuing from the outlet to retard the flow of such glass, one of said means being movable relatively to the other.

43. Glass feeding apparatus comprising a container having an outlet, means for projecting fluid under pressure against the glass at the outlet substantially in the direction of the flow of the glass from the outlet, and means for confining part of said fluid in the vicinity of said outlet to build up pressure opposing the flow of said glass from the outlet, said confining means being adjustable to vary the pressure opposing flow of said glass by varying the volume of fluid permitted to escape from said confining means.

44. Glass feeding apparatus comprising a container having an outlet, a burner surrounding said outlet for projecting a flame against the glass at the outlet, and a movable element for periodically confining products of combustion from said burner to produce a sufficient pressure against the issuing glass to retard its issuance.

45. Glass feeding apparatus comprising a container having a downwardly opening outlet, means for causing a heating blast having a temperature higher than that of the issuing glass to converge against the glass issuing from the outlet, and means movable into and out of position to confine part of said heating blast against the issuing glass to retard the movement of the latter.

In testimony whereof we hereby affix our signatures.

OLIVER M. TUCKER.
WILLIAM A. REEVES.

CERTIFICATE OF CORRECTION.

Patent No. 1,756,109.                                   Granted April 29, 1930, to

OLIVER M. TUCKER ET AL.

It is hereby certified that error appears in the printed specification of the above numbered patent requiring correction as follows: Page 1, line 21, for the word "relation" read "position"; page 11, line 11, claim 23, for "carrying" read "varying"; and that the said Letters Patent should be read with these corrections therein that the same may conform to the record of the case in the Patent Office.

Signed and sealed this 24th day of June, A. D. 1930.

(Seal)

M. J. Moore,
Acting Commissioner of Patents.